Figure 1:
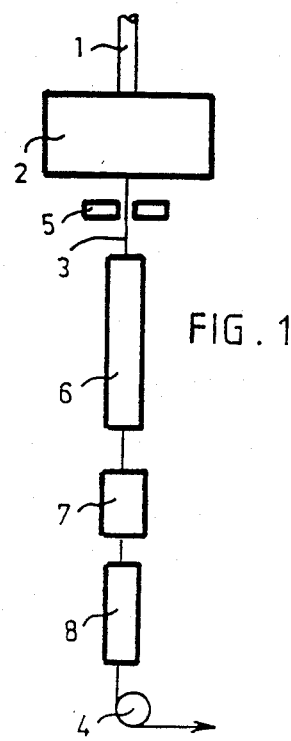

United States Patent [19]

Linden et al.

[11] Patent Number: 4,966,615

[45] Date of Patent: Oct. 30, 1990

[54] APPARATUS FOR COOLING AN OPTICAL FIBER

[75] Inventors: Antti Linden, Atlanta, Ga.; Risto Pennanen, Helsinki; Lena Stormbom, Vantaa, both of Finland

[73] Assignee: Oy Nokia AB, Helsinki, Finland

[21] Appl. No.: 346,973

[22] PCT Filed: Aug. 15, 1988

[86] PCT No.: PCT/FI88/00130

§ 371 Date: Apr. 14, 1989

§ 102(e) Date: Apr. 14, 1989

[87] PCT Pub. No.: WO89/02420

PCT Pub. Date: Mar. 23, 1989

[30] Foreign Application Priority Data

Sep. 8, 1987 [FI] Finland .................................. 873873

[51] Int. Cl.⁵ .............................................. C03B 37/01
[52] U.S. Cl. ............................................ 65/12; 65/13
[58] Field of Search ....................... 65/2, 3.11, 12, 13; 165/154; 138/40, 44

[56] References Cited

U.S. PATENT DOCUMENTS

| | | | |
|---|---|---|---|
| 3,540,870 | 11/1970 | Li | 65/12 |
| 4,146,377 | 3/1979 | Bour | 65/12 |
| 4,174,842 | 11/1979 | Partus | 34/242 |
| 4,400,190 | 8/1983 | Briere | 65/13 |
| 4,437,870 | 3/1984 | Miller | 65/12 |
| 4,504,300 | 3/1985 | Gauthier et al. | 65/12 |
| 4,514,205 | 8/1985 | Darcangelo et al. | 65/12 |
| 4,664,689 | 5/1987 | Davis | 65/3.11 |
| 4,673,427 | 6/1987 | Van Der Gresson et al. | 65/2 |
| 4,778,501 | 10/1988 | Jeskey et al. | 65/3.11 |

FOREIGN PATENT DOCUMENTS

| | | | |
|---|---|---|---|
| 59-97490 | 6/1984 | Japan | 165/154 |
| 83/02268 | 7/1983 | PCT Int'l Appl. | 65/12 |
| 8107823 | 6/1984 | Sweden . | |
| 678255 | 8/1979 | U.S.S.R. | 138/40 |
| 731256 | 4/1980 | U.S.S.R. | 165/154 |

OTHER PUBLICATIONS

Jochem et al., Cooling and Bubble-Free Coating of Optical Fibers . . . 7/1986, Journal of Lightwave Technology, vol. LT-4, No. 7, 739-742.
Pack et al., Forced Convective Cooling of Optical Fibers . . . 10/1979, Journal of Applied Physics, vol. 50, No. 10, 6144-6148.
Glicksman, The Cooling of Glass Fibers, 10/1968, Glass Technology, vol. 9, No. 5, 131-138.
International Search Report, Nov. 14, 1988, Swedish Patent Office.

Primary Examiner—David L. Lacey
Assistant Examiner—John J. Bruckner
Attorney, Agent, or Firm—Finnegan, Henderson, Farabow, Garrett and Dunner

[57] ABSTRACT

A method of and an apparatus for cooling an optical fibre drawn from a heated glass blank by passing the fibre (3) through a cooling pipe (9) in which a cooling gas (A) flows in the axial direction of the fibre around it. In order to reduce the consumption of cooling gas, the cooling gas is caused to flow turbulently (B) around the fibre by a throttle point (20) formed by a partition wall (19) in the cooling pipe, so that a laminar flow of cooling gas around the fibre is prevented and the transfer of heat between the cooling gas and the fibre is improved.

8 Claims, 1 Drawing Sheet

U.S. Patent

Oct. 30, 1990

4,966,615

APPARATUS FOR COOLING AN OPTICAL FIBER

This invention relates to a method of cooling an optical fibre when the fibre is being drawn from a heated glass blank, in which method
the drawn fibre is passed through a cooling space, and
a gaseous cooling medium is supplied in the axial direction of the fibre around the fibre through the cooling space.

In the manufacture of optical fibres, a fibre drawn from a glass blank (preform) has to be coated with a primary coating after the heating apparatus so as to protect the surface of the fibre and to increase the strength of the fibre. In order to cool a hot fibre to a suitable temperature prior to coating, the fibre is passed through a cooling apparatus, in which the fibre is brought into heat transfer contact with a cooling medium.

U.S. Patent Specification 4,388,093 suggests cooling a fibre by passing it through a cooling vessel filled with a liquid cooling medium. The cooling liquid, however, causes considerable sealing problems at the high drawing rates aimed at in modern fibre drawing processes.

According to the teachings of Swedish Patent Specification 433,605, a fibre is cooled by passing it through a cooling apparatus in which a gaseous cooling medium, preferably dry nitrogen gas, is blown towards the fibre through a tubular wall of a porous material. In this way the cooling gas is distributed evenly and the fibre is not exposed to the effects of disadvantageous transverse forces. The use of this kind of cooling arrangement, however, makes it difficult to circulate the cooling medium axially through the cooling space against the direction of movement of the fibre, which would be preferable in view of the transfer of heat.

In an article "Method for cooling and bubblefree coating of optical fibres at high drawing rates", C. Jochem and I. Van der Ligt, Electronics Letters, Aug. 29, 1985, Vol. 21, No. 18, p. 786, it is suggested to cool a fibre by passing it through a water-cooled cooling pipe which is filled with helium gas circulated axially through a cooling space formed by the cooling pipe. Helium gas has a good coefficient of heat transfer, which ensures that the fibre is cooled sufficiently even at high fibre drawing rates. A disadvantage, however, is that large quantities of expensive helium gas are required for cooling the fibre.

The object of the present invention is to provide a method of cooling an optical fibre, which method avoids the above-mentioned disadvantages and enables the achievement of a high cooling efficiency with a relatively small cooling medium flow. This object is achieved by means of a method according to the invention, which is characterized in that the cooling gas is caused to flow turbulently around the fibre at least at one point in the cooling space.

The invention is based on the idea that the turbulence of the cooling medium breaks up the laminar flow of the cooling medium occurring around the fibre to be cooled; consequently, the heat transfer contact between the cooling medium and the surface of the fibre is improved. In addition, the flow of the cooling medium through throttle points provided therefor causes pressure losses, so that the cooling space is divided into compartments in which the medium is pressurized, which improves the heat transfer. The invention thus provides a high cooling efficiency with a smaller consumption of cooling medium, without any risk that the axial flow of the cooling medium causes a disadvantageous laminar flow around the fibre.

The invention is also concerned with a cooling apparatus for effecting the method according to the invention. The apparatus comprises a cooling pipe defining a tubular cooling space, and an inlet and an outlet for passing the fibre axially through the cooling space, and means for supplying a gaseous cooling medium axially through the cooling space. The cooling apparatus is characterized in that the cooling space comprises at least one partition wall positioned between the fibre inlet and the fibre outlet, the partition wall comprising a common opening for the fibre and the cooling gas to pass through, which opening is such in size that the cooling gas flows turbulently therethrough.

According to the invention the means to be added to the cooling pipe for achieving turbulence are very simple in structure, because the partition wall forming the throttle point may be formed by a ringshaped plate comprising a central opening through which the fibre to be cooled and the gaseous cooling medium are passed. The number of partition walls and their mutual spacing in the cooling space are chosen according to the requirements in each particular case so that the turbulent points prevent the formation of disadvantageous laminar flow around the fibre during the cooling step.

In a cooling apparatus in which the cooling pipe is surrounded by a jacket defining a cooling water space between the jacket and the cooling pipe, it is preferable that the ring-shaped partition plate comprises not only an opening common to the fibre and the gas but also a number of flow-through holes for the cooling gas between the compartments divided by the partition plates. This kind of flow-through holes provide more contact area between the gaseous medium and the partition plate cooled by the cooling water space, which further improves the cooling of the fibre.

Tests carried out with a cooling apparatus according to the invention have shown that the gas consumption of the apparatus according to the invention is only 1/15 of the gas consumption of a cooling pipe having no partition plates but with the same cooling efficiency.

Figure 2:
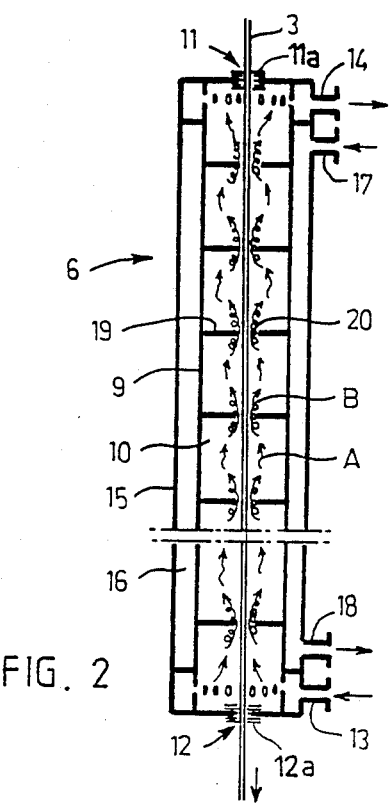
Figure 3:
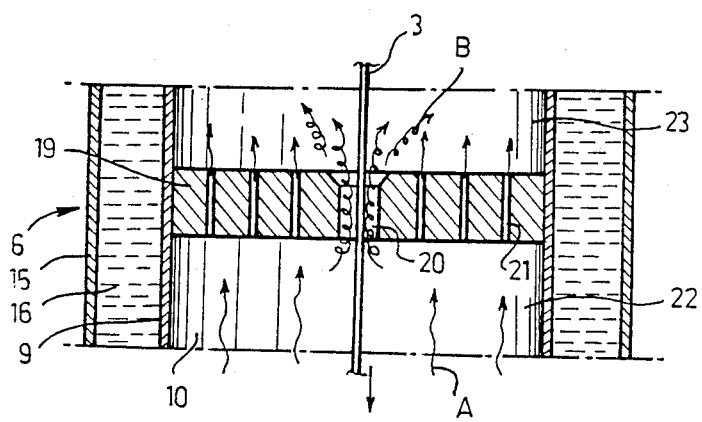

In the following the invention will be described in more detail with reference to the attached drawing, wherein FIG. 1 is a schematical view of the drawing step of an optical fibre;

FIG. 2 is a schematical view of the operating principle of a cooling apparatus according to the invention; and FIG. 3 is a detailed axial sectional view of a partition plate of the cooling apparatus.

In FIG. 1 of the drawing, the reference numeral 1 indicates a glass blank which is heated in a furnace 2 and which forms a fibre 3 which is drawn continuously from the furnace by means of a drawing means 4. The reference numeral 5 indicates a device for measuring the diameter of the fibre. After the furnace the fibre passes through a cooling apparatus 6 into a coating apparatus 7 for a primary layer and further into a hardening unit 8.

The cooling apparatus 6 comprises a metal cooling pipe 9 which defines a cooling space 10 through which the fibre to be cooled passes. An inlet 11 and an outlet 12 for the fibre are provided at the top and at the bottom of the cooling pipe, respectively. The inlet 11 and the outlet 12 are sealed with seals 11a and 12a. At the bottom of the cooling pipe is provided an inlet 13 and at the top an outlet 14 for a cooling gas, such as helium. The cooling pipe is surrounded by a jacket 15, so that a cooling water space 16 is defined between the jacket and the pipe. A water inlet is indicated with the reference numeral 17 and a water outlet with the reference numeral 18.

A number of transverse ring-shaped partition plates 19 axially spaced from each other are mounted within the cooling pipe. Each partition plate comprises a central opening 20 and a number of parallel flow-through holes 21. The openings of the partition plates are positioned concentrically with each other and with the inlet and the outlet for the fibre.

The cooling gas A flows upwards in the cooling space 10, through which the fibre to be cooled passes at a high rate. The openings 20 of the partition plates are so dimensioned that the cooling gas flows turbulently through the opening from a compartment 22 separated by the partition plate to the following compartment 23, FIG. 3. The turbulence B of the cooling gas efficiently breaks up any laminar cooling gas flow, which otherwise tends to be formed around the fibre. This, in turn, improves the transfer of heat between the cooling gas and the fibre, even with a small flow of the cooling gas, thus reducing the consumption of gas. Part of the cooling gas flows through the flow-through holes 21 of the partition plates, which increases the contact area between the gas and the cooling water space.

The partition plates cause pressure losses in the cooling gas flow, which increases the pressure difference between the inlet and the outlet of the cooling gas, so that the heat transfer capacity of the cooling gas contained in the cooling pipe is improved.

The drawing and the description related thereto are only intended to illustrate the idea of the invention. In its details, the method and the apparatus according to the invention may vary within the scope of the claims. Therefore the cooling apparatus is shown only schematically in the drawings. If, for instance, a cooling gas is used which can be released into the atmosphere, the seal 11a and the outlet 14 can be omitted, whereby the cooling gas is discharged through the fibre inlet 11 into the surrounding space.

We claim:

1. An apparatus for cooling an optical fibre drawn from a heated glass blank prior to applying to the fibre a primary coating, the apparatus comprising:
   a cooling pipe defining a tubular cooling space having a longitudinal axis and having an inlet at one end and an outlet at the opposite end of the cooling pipe for passing the fibre axially through the cooling space; and
   at least one wall extending transverse to the longitudinal axis of the cooling tube and positioned across the cooling tube so as to partition the space between the inlet and the outlet, the at least one wall having a central opening for passing both the fibre and the cooling gas therethrough simultaneously and having multiple through holes whose axes of symmetry are approximately parallel to the longitudinal axis of the cooling pipe and whose axes are not coincident, the central opening having an area relative the cross-sectional area of the cooling space effective to cause the cooling gas in the cooling space to flow turbulently through the central opening of the at least one wall around the fibre.

2. The apparatus of claim 1 wherein the at least one wall is a plurality of axially spaced walls, each having said central opening aligned with the inlet and outlet of the cooling pipe.

3. The apparatus of claim 2 wherein the cooling pipe includes a cooling gas inlet means and a cooling gas outlet means, and the inlet at one end for passing the fibre and the outlet end for passing the fibre is disposed adjacent the gas inlet means, so as to flow the gaseous medium and pass the fibre in opposite directions through the central opening of each of the plurality of walls.

4. The apparatus of claim 1 further comprising a jacket surrounding the cooling pipe defining an annular cooling water space between the jacket and the cooling pipe; and wherein the at least one wall comprises a plate having a peripheral edge corresponding to an inner peripheral configuration of the pipe, attached to the pipe and dividing the pipe axially into separate compartments.

5. The apparatus of claim 2 further comprising a jacket surrounding the cooling pipe and defining an annular cooling water space between the jacket and the cooling pipe; and wherein the plurality of spaced walls each comprises a plate having a peripheral edge corresponding to an inner peripheral configuration of the pipe, attached to the pipe and dividing the pipe axially into at least three separate compartments.

6. The apparatus of claim 1 wherein the cooling pipe includes cooling gas inlet means and cooling gas outlet means, and the inlet at one end for passing the fibre is disposed adjacent the gas outlet means and the outlet end for passing the fibre is disposed adjacent the gas inlet means, so as to flow the gaseous medium and pass the fibre in opposite directions through central opening of each of the plurality of walls.

7. An apparatus for cooling an optical fibre drawn from a heated glass blank prior to applying to the fibre a primary coating, the apparatus comprising:
   a cooling pipe defining a tubular cooling space having a longitudinal axis and having an inlet at one end and an outlet at the opposite end of the cooling pipe for passing the fibre axially through the cooling space;
   a jacket surrounding the cooling pipe defining an annular cooling water space between the jacket and the cooling pipe; and
   means for passing a gaseous cooling medium through the cooling space including at least one plate having a peripheral edge corresponding to an inner peripheral configuration of the pipe, attached to the pipe and dividing the cooling space axially into separate compartments between the inlet and the outlet, the at least one plate having a central opening for passing both the fibre and the cooling gas therethrough simultaneously and having a plurality of spaced through holes for passing the gaseous medium between the compartments, the central opening having an area relative the cross-sectional area of the cooling space effective to cause the cooling as in the cooling space to flow turbulently through the central opening of the at least one plate around the fibre.

8. The apparatus of claim 7 wherein the at least one plate constitutes a plurality of axially spaced walls, each having a central opening aligned with the inlet and outlet of the cooling pipe and dividing the pipe axially into at least three separate compartments.

* * * * *

UNITED STATES PATENT AND TRADEMARK OFFICE
CERTIFICATE OF CORRECTION

PATENT NO. : 4,966,615
DATED : October 30, 1990
INVENTOR(S) : Antti Linden et al.

It is certified that error appears in the above-identified that said Letters Patent is hereby corrected as shown below:

Claim 3, column 4, line 6, "fibre" (1st occurrence) should be followed by --is disposed adjacent the gas outlet means--.

Signed and Sealed this

Tenth Day of May, 1994

*Attest:*

BRUCE LEHMAN

*Attesting Officer*     Commissioner of Patents and Trademarks